United States Patent
Capraro et al.

(10) Patent No.: US 10,317,520 B2
(45) Date of Patent: Jun. 11, 2019

(54) RADAR SYSTEM

(71) Applicant: SRC, Inc., North Syracuse, NY (US)

(72) Inventors: Christopher Thomas Capraro, Utica, NY (US); Eva Beth Piltch, West Monroe, NY (US); Jason Michael Steeger, Baldwinsville, NY (US)

(73) Assignee: SRC, Inc., North Syracuse, NY (US)

( * ) Notice: Subject to any disclaimer, the term of this patent is extended or adjusted under 35 U.S.C. 154(b) by 590 days.

(21) Appl. No.: 15/074,162

(22) Filed: Mar. 18, 2016

(65) Prior Publication Data

US 2018/0074185 A1 Mar. 15, 2018

(51) Int. Cl.
*G01S 13/08* (2006.01)
*G01S 13/524* (2006.01)
*G01S 13/90* (2006.01)
*G01S 13/42* (2006.01)
*G01S 13/86* (2006.01)

(52) U.S. Cl.
CPC .......... *G01S 13/5244* (2013.01); *G01S 13/42* (2013.01); *G01S 13/867* (2013.01); *G01S 13/90* (2013.01); *G01S 13/08* (2013.01)

(58) Field of Classification Search
CPC ...... G01S 13/08; G01S 13/5244; G01S 13/90; G01S 13/42; G01S 13/867
See application file for complete search history.

(56) References Cited

U.S. PATENT DOCUMENTS

| 5,767,802 A | 6/1998 | Kosowsky |
| 6,252,540 B1 | 6/2001 | Hale |
| 6,400,306 B1 | 6/2002 | Nohara |
| 6,633,253 B2 | 10/2003 | Cataldo |
| 7,193,558 B1 | 3/2007 | Gerlach |
| 7,259,714 B1 | 8/2007 | Cataldo |

(Continued)

FOREIGN PATENT DOCUMENTS

| CN | 101930605 | 12/2010 |
| CN | 102288948 | 12/2011 |

OTHER PUBLICATIONS

Wicks et al., "An Efficient Architecture for Nonhomogeneity Detection in Space-Time Adaptive Processing for Airborne Early Warning Radar," Proceedings of the 1997 IEE Radar Conference, Oct. 1997, Edinburgh, UK; (accessed Mar. 18, 2015).

(Continued)

*Primary Examiner* — Timothy X Pham
(74) *Attorney, Agent, or Firm* — Bond Schoeneck & King, PLLC; George McGuire

(57) ABSTRACT

A radar system includes an image forming circuit that provides a two-dimensional image of an operating environment. The image includes pixel elements representative of the operating environment. The system includes at least one filter configured to convert the two-dimensional image into a clutter classification map of clutter regions. A predetermined number of clutter regions are selected as training cells for a predetermined cell-under-test (CUT). A space-time adaptive processor (STAP) is configured to derive a weighted filter from training cell data. The STAP applies the weighted filter to a digital return signal associated with the predetermined CUT to provide a STAP-filtered digital return signal having the clutter signal components substantially eliminated therefrom.

38 Claims, 8 Drawing Sheets

(56) References Cited

U.S. PATENT DOCUMENTS

| | | | |
|---|---|---|---|
| 7,369,083 B2 | 5/2008 | Budic | |
| 8,587,471 B2 | 11/2013 | Ferretti | |
| 8,836,573 B2 | 9/2014 | Yanagihara | |
| 8,907,841 B2 | 12/2014 | Sahinoglu | |
| 2003/0210175 A1* | 11/2003 | Bickert | G01S 7/2927 342/93 |
| 2006/0109162 A1* | 5/2006 | Krikorian | G01S 13/90 342/25 B |
| 2010/0073218 A1* | 3/2010 | Stockmann | G01S 7/2923 342/146 |
| 2012/0127027 A1* | 5/2012 | Sahinoglu | G01S 13/5242 342/189 |
| 2017/0016988 A1* | 1/2017 | Numata | G01S 7/36 |

OTHER PUBLICATIONS

Melvin et al., "Improving Practical Space-Time Adaptive Radar," Proceedings of the 1997 IEEE National Radar conference, May 1997. Syracuse, NY.: (accessed Mar. 18, 2015).

Adve et al., "Transform Domain Localized Processing Using Measured Steering Vectors and Non-Homogeneity Detection," Proceedings of the 1999 IEEE National Radar Conference, Apr. 1999, Boston, Mass. (accessed Mar. 18, 2015).

\* cited by examiner

RADAR SYSTEM

BACKGROUND OF THE INVENTION

1. Field of the Invention

The present invention relates generally to radar signal processing, and particularly to radar signal processing that employs agile data selection for space-time adaptive processing.

2. Technical Background

The word "radar" is actually an acronym that stands for "RAdio Detection And Ranging." A radar system is one that employs radio frequency (RF) signals to detect (or image) a variety of objects such as aircraft, ships, spacecraft, guided missiles, motor vehicles, weather formations, and terrain. When detecting an object, the radar system can be configured to determine the object's range (distance), bearing (angle), and/or velocity. Briefly stated, when the radar transmits an RF signal that impinges an object, a return signal is reflected back toward the radar receiver. The return signal is detected if it is stronger than the noise signals that may be present in the receiver. A target's bearing corresponds to the direction (0°-360°) of the reflected return signal relative to the radar system. The distance ("range") of the object relative to the radar system is determined by measuring the time between the RF signal transmission and the reception of the return signal (since the RF signal travels at a known velocity, i.e., the speed of light). While the above stated process sounds relatively straightforward in theory, radar signal processing can be challenging in practice. This is especially true when airborne radars are used to detect slow moving objects (e.g., targets).

When airborne or spaceborne radars are employed in this manner, they are typically configured to sense ground targets by detecting their motion. While this type of radar application (ground motion detection) has civilian applications (e.g., traffic control), it is more likely to be employed in military applications. Specifically, reliable intelligence is required to develop accurate situational awareness. Moreover, military commanders must use their assets smartly and efficiently since resources are limited. The use of airborne (or spaceborne) radar can significantly improve situational awareness by providing information regarding where the targets of interest are, how big they are, where they are going, and how fast they are going. As one might suspect, this is easier said than done.

In reference to FIG. 1, an illustration of an operational environment 1000 of an airborne radar system 10 is depicted. In this view, the radar system is side-mounted on a moving aircraft 100. For the sake of discussion, the aircraft 100 is shown in a three-dimensional space specified by a Cartesian coordinate system having x, y, z axes. (Using this system, a point on the surface of the earth can be defined by its x, y coordinates and the altitude of the aircraft 100 can be defined by its x, y, and z-coordinates. The range to any object on the ground could then be found using the Pythagorean Theorem. As explained below, an object's position on the ground may be specified by latitude and longitude or any other suitable geospatial positioning methods). Notionally, the aircraft 100 is traveling along, substantially in parallel with the y-axis, at some altitude while transmitting a pulsed frequency modulated radar signal 100-10 (a linear frequency modulated pulse is sometimes referred to as a "chirp signal", although any modulated signal could be used). At regular temporal intervals, the chirp signal illuminates a footprint region 100-12 so that various return signals 100-14 are reflected back to the radar 10 during a listening interval. This procedure continues as the aircraft proceeds along its path so that the footprint 100-12 also moves along with it until the entire operational environment 1000 is illuminated. Of course, the radar 10 includes a receiver and a radar signal processor that is configured to process all of the return signals and detect a target if one is present in environment 1000.

Referring again to FIG. 1, the transmitted chirp signal 100-10 may impinge on various types of objects during the process of illuminating the operational area 1000. These objects include hills (or mountains) 1002, vegetation such as deciduous trees 1004-1, evergreen trees 1004-2, grasses 1006, etc.), bodies of water 1008, buildings 1010 and roads 1012, to name a few. (Hidden amongst these objects may be a target). Because the various objects listed above have different physical properties, return signals 100-14 that are reflected off of these objects may also be different or have different signal qualities. For example, an RF signal that is reflected off of a brick building may be stronger and have different spectral and polarimetric characteristics than a signal reflected from a grass field or a tree. The return signals from the various types of objects (not including the target) are referred to in the art as "clutter signals." Moreover, the operational environment 1000 may include one or more jammers, i.e., devices that transmit high-powered signals toward the radar in an effort to "blind" the radar and thus hide the target. The detection problem is further compounded by the presence of "white noise" or random Gaussian noise that is generated by the radar receiver circuitry itself.

Thus, the target detection problem boils down to the ability to distinguish an RF target return signal from clutter and noise signals. This problem is exacerbated when the target has a small radar cross section (RCS), which is the measure of an object's ability to reflect radar signals back towards the radar receiver, and/or if the target is relatively slow moving.

The detection problem has been solved, with varying degrees of success, by using mathematical models that help to distinguish targets from clutter and noise signals.

In one approach that has been considered, the Doppler effect has been used to distinguish moving targets from stationary ones. According to the Doppler effect, when a moving object approaches a radar, the target's return radar signal will exhibit a positive frequency shift due to the increased radial velocity between the radar and the target. Alternatively, if the target is moving away from the radar, the target's radar return signal will have a negative frequency shift due the decreased radial velocity between the radar and the target. Again, this frequency shift is often referred to as the target's "Doppler" and the relevant velocity component is the Doppler velocity. Doppler radar is often used in ground based radar applications because the clutter returns are stationary (and thus do not exhibit any frequency shift). Thus, the radar receiver need only filter out the near zero-Doppler returns: the unfiltered returns will exhibit either a positive Doppler (moving toward the radar) or a negative Doppler (moving away from the radar); in either case, the returns will be indicative of a moving target. One drawback to this approach relates to the fact that airborne or spaceborne platforms are typically in motion when the radar is operating. When a radar platform is moving (e.g., it is mounted on an aircraft), the clutter signals from different angles will appear to move at different velocities and thus impart a spread of Doppler frequencies that can mask a moving target (the return signals are thus angle dependent). What is needed, therefore, is a method that takes into account the motion of the radar platform.

In another approach, space-time adaptive processing (STAP) has been employed to filter the return signals in both angle and in Doppler so that the radar processor (mounted on a moving platform) can more effectively distinguish between clutter and target returns. In this approach, the radar system includes multiple antenna elements (spaced apart in an antenna array) coupled to respective receivers; this is the spatial component of "space-time." The radar is further configured to repeatedly transmit the chirp signal in accordance with a pulse repetition frequency (PRF). The reciprocal of the PRF (1/PRF) is the pulse repetition interval (PRI), i.e., the listening time between each transmitted chirp signal. During each interval, the radar transmits the chirp signal and then listens for return signals. Accordingly, there are a number of PRIs (transmit/receive intervals) that occur over a larger time frame commonly known as a coherent processing interval (CPI). The PRI and CPI are the time components of space-time. Moreover, the time axis of collected range samples within each PRI is commonly known as "fast-time," whereas the time axis of collected chirp signals within each CPI is commonly referred to as "slow-time" since the velocity of the radar/targets is slower than the chirp velocity, which is near the speed of light.

With respect to fast-time, the range of an object is determined by measuring the time between the RF signal transmission and the reception of the return signal. Thus, the radar receiver is configured to periodically sample return signals during each fast-time period (i.e., during the PRI) in order to obtain range samples at specified times during the PRI. These range samples are stored in memory (range bins). Since there are multiple antenna elements and channels, the radar receiver obtains a set of range samples for each channel. Thus, each PRI yields a two dimensional slice of radar return data: the spatial dimension corresponds to the antenna elements and the second dimension corresponds to fast-time (range). Stated differently, one PRI yields a series of range samples for each antenna element. Thus, when all of the PRIs have been completed, the CPI yields a cube of radar return data; each cell is specified by a particular antenna element (space), a particular range (fast-time), and a particular chirp (slow-time). Briefly stated, the STAP processor creates a filter that is designed to amplify the targets (within the data cube) while attenuating all other signals (clutter) or noise sources (in the data cube).

At the beginning of the STAP process, the STAP processor is supplied with two hypotheses: the first is that there is no target in a predetermined cell within the data cube (cell-under-test, i.e., CUT) and the second is that there is a target in the CUT. Subsequently, the conventional STAP processor selects data cube cells that are in close proximity to the CUT to obtain "training data." In so doing, the conventional STAP processor hopes that the training data: (1) does not include other targets; and (2) represents clutter and noise that is identical or similar to the clutter and noise in the CUT. The training data is used to calculate a weighted function (based on a "covariance matrix") that, when applied to the CUT, substantially "zeroes-out" or eliminates the clutter and noise so that, if a target exists in the CUT, the target signal is clearly revealed.

One drawback to STAP relates to the problems associated with selecting appropriate training data. In order to estimate the clutter covariance matrix needed for space-time adaptive processing, range cells located close to the CUT are normally chosen as secondary or training data. If N cells are required for estimation, N/2 above the test cell, or CUT, and N/2 below the test cell, excluding guard cells, are typically chosen. This "sliding window" method of training data selection assumes that the selected N samples are representative of the clutter in the CUT. However, in a nonhomogeneous terrain environment this assumption may not be valid. As FIG. 1 illustrates, a target may be surrounded by a wide variety of clutter sources (earth, rocks, trees, buildings, water, etc.), and thus, the selection of training data that truly represents the clutter signals produced by these various clutter sources can be quite problematic.

The amount of training data required for proper estimation of the covariance matrix in a stationary environment is between 2 and 5 times the number of degrees of freedom (DoF) of the radar assuming the clutter is Gaussian distributed. (DoF means the number of variables in the weighting calculation: e.g., the number of elements times the number of pulses or Doppler bins used in adaptive processing). As FIG. 1 illustrates, the training data needed may geographically span hundreds of meters, or even kilometers, depending on the range resolution and the DoF of the radar. Terrain boundaries such as land-water or urban-grassland interfaces are likely to occur. As those skilled in the art will appreciate, this statistical nonstationarity due to nonhomogeneous terrain can lead to a poor estimation of the clutter covariance matrix and, in turn, poor cancellation of the clutter.

In one approach, digital land classification and elevation terrain data has been employed as an aid in selecting training data. One drawback to this approach relates to the fact that a terrain data map—even if the mapping data is an hour old (a best case scenario)—can be obsolete or non-representative of the actual conditions on the ground an hour later. Any terrain response is time dependent because there are a variety of factors that can modify the terrain environment over time such as weather, seasonal changes, man-made development, etc. For example, if there is snow or rainfall on the ground, the conditions on the ground will be changed. Moreover, the best case scenario is optimistic because terrain maps usually take a certain amount of time to produce. In the interim, crops can be sown or harvested, trees cut-down, lakes drained or filled, or buildings can be constructed or razed. Furthermore, the sensing modalities employed in generating the terrain maps may not have similar RF attributes to the radar such as frequency, spectral bandwidth, orientation (e.g., aspect angle), etc. As a result, "canned" digital terrain data may not, and most likely will not, represent the terrain being illuminated by the radar.

What is needed, therefore, is a system and method configured to obtain a real-time clutter map. A system and method is needed that uses the same sensor and sensor data that is used to detect the target. Moreover, a system and method is needed to obtain the clutter map using the same signal characteristics that are used in target detection.

SUMMARY OF THE INVENTION

The present invention addresses the needs described above by providing a system and method configured to obtain a real-time clutter map. The present invention uses the same sensor and sensor data that is used to detect the target. Moreover, the present invention uses the same sensor so that the clutter map is obtained by transmitting a signal that has the same signal characteristics that are used in target detection.

One aspect of the present invention is directed to a radar system that includes an RF assembly configured to convert incident RF signals reflected from an operating environment into a plurality of digital signals, the plurality of digital signals including at least clutter signal components. An image forming circuit is coupled to the RF assembly, the image forming circuit being configured to provide a two-dimensional image of the operating environment based on the plurality of digital signals, the two-dimensional image including a plurality of pixel elements representative of the operating environment. At least one filter is coupled to the image forming circuit, at least one filter being configured to convert the two-dimensional image into a clutter classification map comprising a plurality of clutter regions, the at least one filter being further configured to select a predetermined number of clutter regions from the plurality of clutter regions for use as training cells for a predetermined cell-under-test (CUT). A space-time adaptive processor (STAP) is coupled to the at least one filter, the STAP being configured to derive a weighted filter from the digital signals corresponding to the training cells, the STAP being further configured to apply the weighted filter to a digital return signal associated with the predetermined CUT to provide a STAP filtered digital return signal having the clutter signal components substantially eliminated therefrom.

In one embodiment, the plurality of clutter regions are range-Doppler cells.

In one embodiment, the image forming circuit includes a synthetic aperture radar (SAR) processing circuit, the two-dimensional image being a SAR image based on the plurality of digital signals, the SAR image including a plurality of pixel elements representative of the operating environment, each pixel element being characterized as an complex scattering value.

In one version of the embodiment, each clutter region is characterized by a composite scattering value based on the complex scattering values of the pixel elements within the clutter region.

In one version of the embodiment, each complex scattering value is based on a complex scattering matrix.

In one embodiment, at least one filter includes a terrain classifier circuit coupled to the image forming circuit, the terrain classifier being configured to register the plurality of clutter regions to geographical coordinates on the Earth and determine a range associated with each pixel of the plurality of pixels relative to the radar system.

In one version of the embodiment, the terrain classifier circuit is further configured to partition the plurality of pixels into a plurality of pixel sets, each pixel set substantially corresponding to one of the plurality of clutter regions.

In one version of the embodiment, the terrain classifier circuit is further configured to derive an classification vector for each pixel set, the training cells being selected based on comparing the classification vector of each clutter region to the classification vector of the predetermined CUT.

In one embodiment, the at least one filter comprises: a terrain classifier circuit configured to subdivide the two-dimensional image into a plurality of classification regions substantially corresponding to the plurality of clutter regions, the terrain classifier circuit being further configured to derive a classification vector for each classification region; and a terrain filter configured to select a set of similar clutter regions from the plurality of classification regions on the basis of their respective classification vectors.

In one version of the embodiment, each pixel of the plurality of pixels disposed in a classification region is characterized by a value, the classification vector for each classification region being based on the values of the plurality of pixels disposed in a classification region.

In one version of the embodiment, the at least one filter further comprises a non-homogeneity filter, the non-homogeneity filter being configured to select the training cells from the set of similar clutter regions based on comparing the classification vector for each clutter region to a predetermined similarity value.

In one version of the embodiment, the predetermined similarity value is related to a statistical average of the classification vectors associated with the set of similar clutter regions.

In one version of the embodiment, the system further comprises a detector circuit coupled to the STAP, the detector being configured to designate the STAP filtered digital return signal as a detection if the STAP filtered digital return signal is greater than a predetermined threshold.

In one version of the embodiment, the terrain filter is configured to remove a CUT from a subsequent set of similar clutter regions when the detector determines that the STAP filtered digital return signal in the CUT is a detection.

In one embodiment, the weighted filter is based on an interference covariance matrix.

In one embodiment, at least one filter includes a non-homogeneity filter that compares candidate training data statistics to identify outlier training cells within candidate training cells, the outlier training cells being excluded from the training cells.

In one version of the embodiment, the candidate training data statistics are based on statistics obtained from a magnitude median filter.

In one version of the embodiment, the candidate training data statistics are based on higher-order phase information obtained from channels, pulses, or Doppler, the non-homogeneity filter being configured to use the higher-order phase information to identify statistically similar training data and statistically dissimilar training data, the candidate training cells being characterized by statistically dissimilar training data are identified as outlier training cells and are excluded from the training cells.

In one embodiment, the system further comprises: a detector circuit coupled to the STAP, the detector being configured to designate the STAP filtered digital return signal as a detection if the STAP filtered digital return signal is greater than a predetermined threshold; and a detection exclusion filter configured to exclude a former CUT clutter region from a subsequent set of similar clutter regions when the detector determines that the STAP filtered digital return signal from the former CUT clutter region yielded a target detection.

In one embodiment, the system further comprises a detection exclusion filter that uses a relatively low predetermined threshold to detect relatively weak target return signals in the CUT, the relatively weak target return signals having signal characteristics comparable to the clutter signal components, and wherein the STAP excludes each CUT that yields a target detection from a subsequent weighted filter derivation.

In another aspect, the present invention is directed to a method for use in a radar system, the method comprising: providing a plurality of digital signals corresponding to incident RF signals reflected from an operating environment, the plurality of digital signals including clutter signal components; providing a two-dimensional image of the operating environment based on the plurality of digital signals, the two-dimensional image including a plurality of pixel elements representative of the operating environment; converting the two-dimensional image into a clutter classification map comprising a plurality of clutter regions; selecting a predetermined number of clutter regions from the plurality of clutter regions for use as training cells for a predetermined cell-under-test (CUT), the predetermined CUT having a digital return signal associated therewith; deriving a weighted space-time adaptive (STAP) filter from the digital signals corresponding to the training cells; and applying the weighted STAP filter to the digital return signal to substantially eliminate the clutter signal components from the digital return signal to provide a STAP filtered digital return signal.

In one embodiment, the plurality of clutter regions are range-Doppler cells.

In one embodiment, the two-dimensional image is SAR image having a plurality of pixel elements representative of the operating environment, each pixel element being characterized by a value.

In one version of the embodiment, each clutter region is characterized by a composite scattering value based on the values of the pixel elements within the clutter region.

In one version of the embodiment, each value is based on a complex scattering matrix.

In one version of the embodiment, the training cells are selected in accordance with their respective composite scattering values.

In one embodiment, the method further comprises the steps of: registering the plurality of clutter regions to geographical coordinates on the Earth; and determining a range associated with each pixel of the plurality of pixels relative to the radar system.

In one version of the embodiment, the method includes the step of partitioning the plurality of pixels into a plurality of pixel sets, each pixel set substantially corresponding to one of the plurality of clutter regions.

In one version of the embodiment, the step of selecting the training cells includes: deriving a classification vector for each pixel set; and comparing the classification vector for each pixel set to the classification vector of the predetermined CUT.

In one embodiment, the method further comprises the steps of: subdividing the two-dimensional image into a plurality of classification regions substantially corresponding to the plurality of clutter regions; deriving a classification vector for each classification region; and selecting a set of similar clutter regions based on their respective classification vectors.

In one version of the embodiment, each pixel of the plurality of pixels disposed in a classification region is characterized by a complex scattering value, the classification vector for each classification region being based on the complex scattering values of the plurality of pixels disposed in a classification region.

In one version of the embodiment, the method includes the step of selecting the training cells from the set of similar clutter regions based on comparing the classification vector of each clutter region in the set of similar clutter regions to a predetermined similarity value.

In one version of the embodiment, the predetermined similarity value is related to a statistical average of the classification vectors associated with the set of similar clutter regions.

In one version of the embodiment, the method includes the step of designating the STAP filtered digital return signal as a detection if the STAP filtered digital return signal is greater than a predetermined threshold.

In one embodiment, the weighted filter is based on an interference covariance matrix.

In one embodiment, the method further comprises the step of comparing candidate training data statistics to identify outlier training cells within candidate training cells, the outlier training cells being excluded from the training cells.

In one version of the embodiment, the candidate training data statistics are based on statistics obtained from a magnitude median filter.

In one version of the embodiment, the candidate training data statistics are based on higher-order phase information obtained from channels, pulses, or Doppler, the higher-order phase information being employed to identify statistically similar training data and statistically dissimilar training data, the candidate training cells being characterized by statistically dissimilar training data are identified as outlier training cells and are excluded from the training cells.

In one embodiment, the method further comprises the steps of: designating the STAP filtered digital return signal as a detection if the STAP filtered digital return signal is greater than a predetermined threshold; and excluding a former CUT clutter region from a subsequent set of similar clutter regions when determining that the STAP filtered digital return signal from the former CUT clutter region yielded a target detection.

In one embodiment, the method further comprises the steps of: using a relatively low predetermined threshold to detect relatively weak target return signals in the CUT, the relatively weak target return signals having signal characteristics comparable to the clutter signal components; and excluding each CUT that yields a target detection from a subsequent weighted filter derivation.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
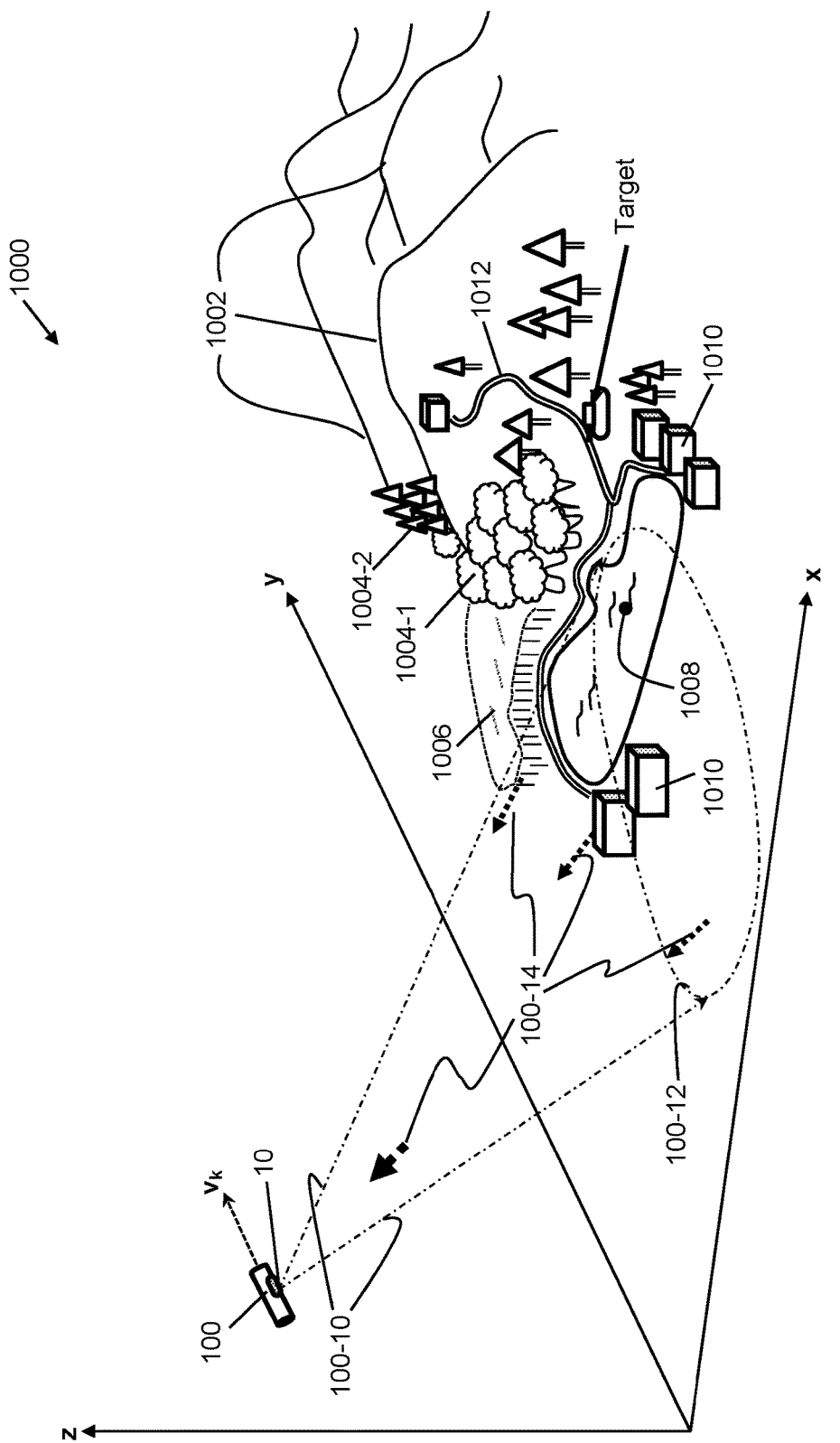
FIG. 1 is an illustration of a typical operational environment for an airborne radar system.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the radar system of the present invention is shown in FIG. 2, and is designated generally throughout by reference numeral 10.

Figure 2:
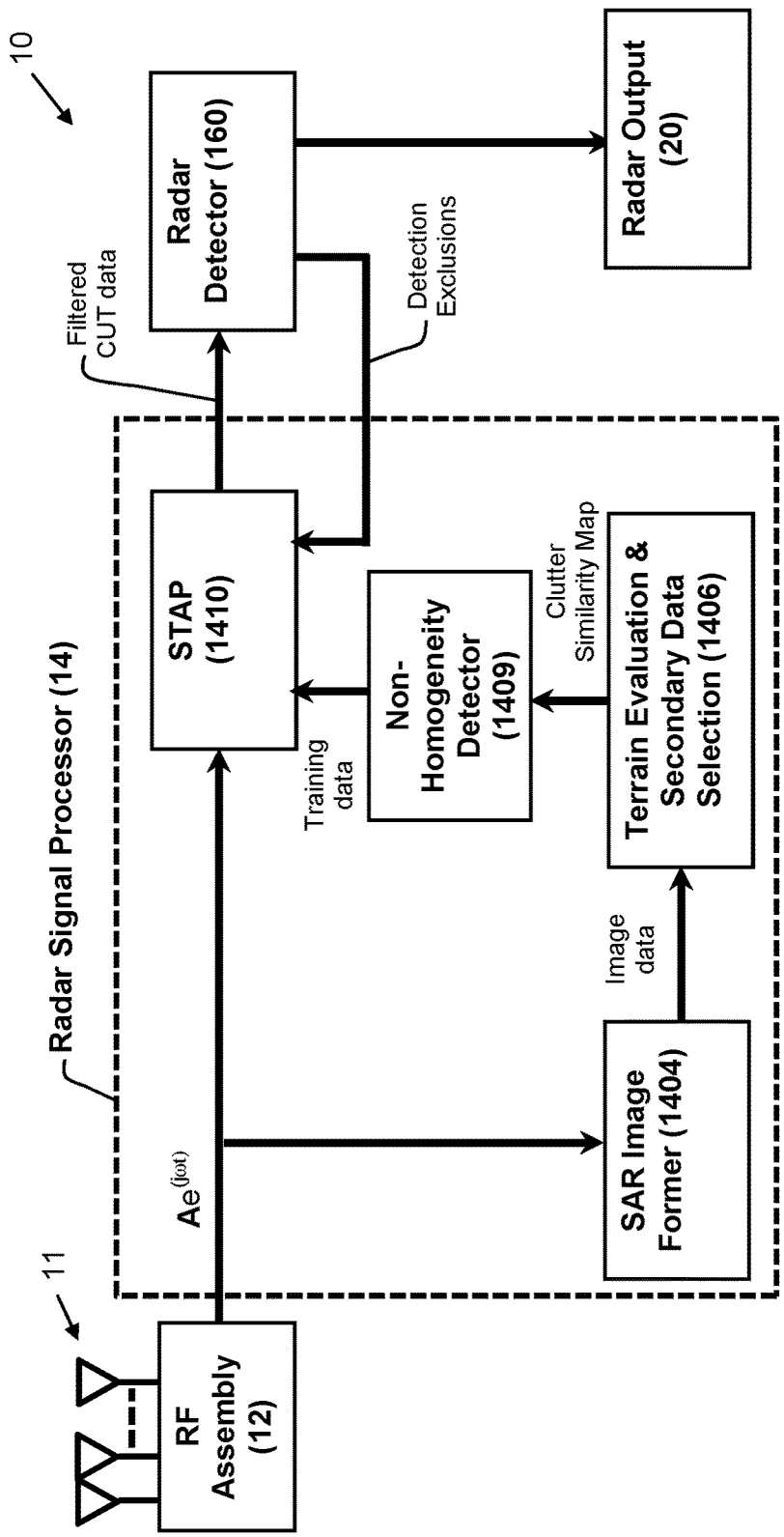
FIG. 2 is a high level block diagram of the system in accordance with an embodiment of the present invention.

As embodied herein, and depicted in FIG. 2, a high level block diagram of the system 10 in accordance with an embodiment of the present invention is disclosed. The system 10 includes an antenna array 11 coupled to an RF assembly 12. In any space-time adaptive processing radar, multiple antenna elements/channels are required. Those skilled in the art will appreciate that the antenna array 11 may include a linear 1×N array, N being an integer value greater than two (2), or a two dimensional L×N array, wherein L and N are integer values greater than two (2). The array may be configured as a conformal array, or may be configured in any suitable geometry as long as the antenna includes more than one antenna element. The RF assembly 12 is a pulse Doppler radar configured to transmit a predetermined modulated pulse in a given PRI and listen for reflected return signals during the subsequent PRI listening interval.

Figure 4:
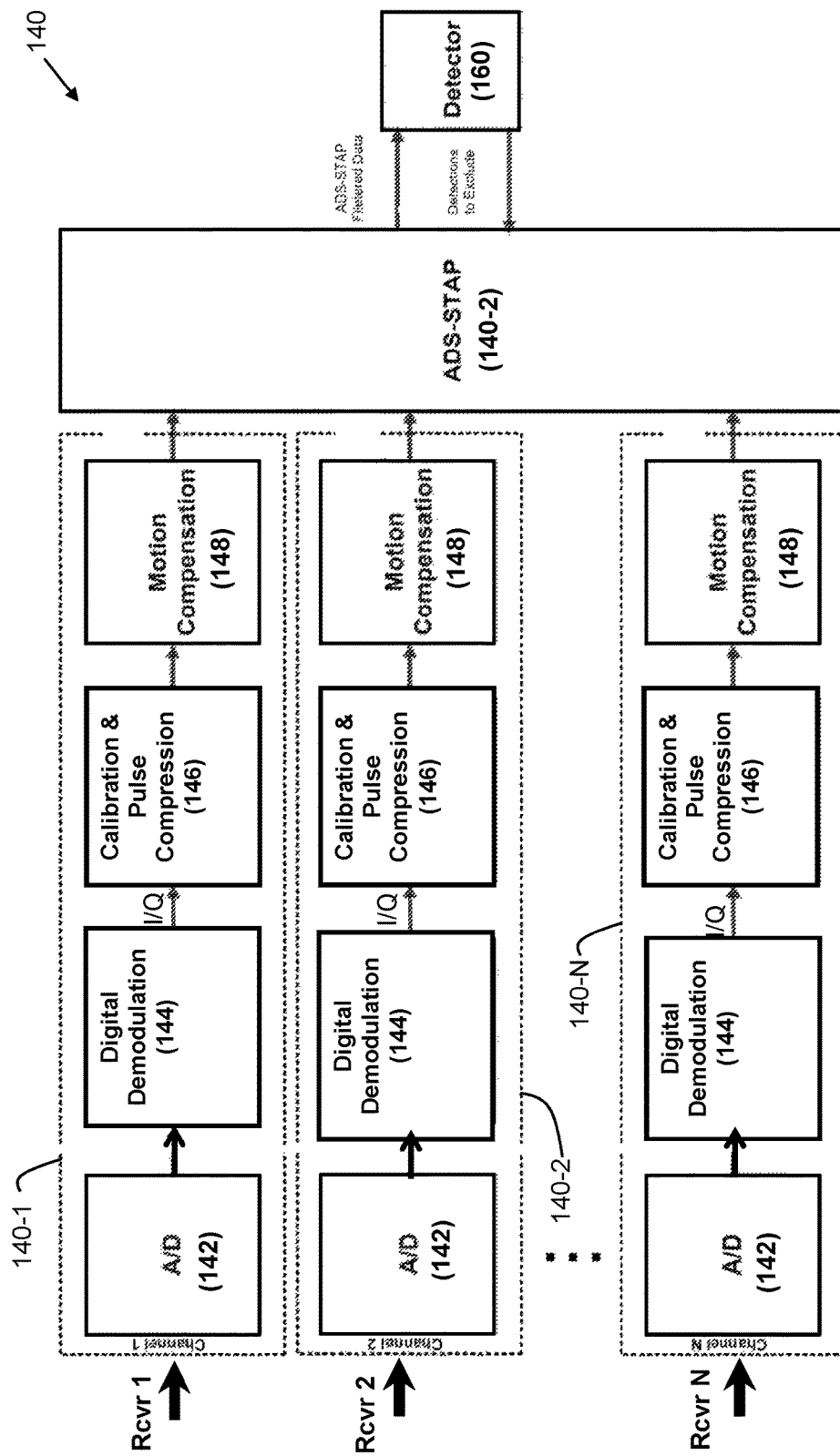
FIG. 4 is a diagrammatic depiction of the pre-detection processing elements shown in FIG. 3.

The return signals are provided to the radar signal processor 14 in the form of complex signals ($Ae^{(j\omega t)}$), where A represents the amplitude and the argument of the exponential includes phase and frequency information. (To be clear, and as shown in FIG. 4, the return signals are digitized, calibrated and pre-processed before radar signal processing occurs). Thus, digitized return signals are directed along parallel paths: the first path includes the Synthetic Aperture Radar (SAR) image former and terrain evaluation path; and the second path includes the STAP processor 1410.

In the first path the digitized return signals are provided to a SAR Image former 1404. The SAR image former 14104 is configured to provide at least a partially formed SAR image (i.e., low azimuth resolution) using both range and azimuth compression techniques. The SAR image data consists of an array of pixels, with each pixel having a certain complex value (i.e., magnitude and phase). The pixels in the SAR image data are quantized so that each pixel is represented by a complex scattering value (e.g., a four bit scheme yields 16 levels, an eight bit quantization scheme has 256 levels, etc.).

The complex pixel data is provided to the terrain evaluation & secondary data selection module 1406. The terrain evaluation module 1406 is configured to form a clutter classification (or similarity) map that clusters pixel data into regions of similar statistics. The clutter similarity map and the range-Doppler cells are also "registered" (i.e., aligned) to latitude and longitude, so that the clusters are fixed to identifiable areas of the earth as well as range-Doppler cells. In some embodiments, there can be one pixel per range-Doppler cell, but typically there will be a plurality of pixels associated with each range-Doppler cell. The terrain evaluation block 1406 is configured to provide the non-homogeneity detector 1409 with a single classification value for each range-Doppler cell, based upon the classifications of the pixels within a range-Doppler cell.

There are at least two reasons, or assumptions, for using the non-homogeneity detector 1409. First, the training data will yield a much better filter if the clutter in the training data is statistically the same as the clutter in the CUT. Second, the training data will yield a much better filter if there are no moving objects or strong discrete objects in the training data. The terrain evaluation module 1406 provides candidate training data based upon the SAR image, which is related to the type of clutter being illuminated, and aids with the first assumption by choosing training data that has similar clutter to the CUT. However, strong discrete objects such as large antennas and moving objects may still be contained in the training data. Thus, the non-homogeneity detector 1409 compares (e.g., statistically) each range-Doppler cell, one cell at a time, against the other training data in order to remove any additional outliers from the final training data. Examples of a non-homogeneity detectors can be a simple first-order, magnitude, median filter or a more complex, second-order, whitening, median filter that includes channel and pulse/Doppler phasing. The non-homogeneity detector 1409 provides the selected training data to the STAP processor 1410.

Thus, by virtue of the parallel processing structure of the RSP 14, the selected training data provided to the STAP processor 1410 is based on a real-time clutter map that was obtained by the same sensor that is used by the STAP processor.

FIG. 2 also shows that the radar detector 160 provides feedback information to the STAP processor 1410. Small moving targets and their sidelobes are often much lower in magnitude than the competing clutter in the same cell and may be difficult to detect using the terrain classifying filter and the non-homogeneity filter. However, they have an outsized impact on adaptive losses if included in the training data. Once clutter is canceled by applying STAP 1410 to the data, small movers are only competing with noise and clutter residue, making them easier to detect. The feedback from the detection exclusion filter 1407 in FIG. 5 removes target detections from the collection of candidate training cells and STAP is performed again with the final set of ADS-STAP filtered training cells. The result is fed into the detector 160, and cells that are above a predetermined threshold are reported as target detections.

Finally, any detected targets are provided to a radar output device such as a plan position indicator (PPI), wherein the radar antenna is shown at the center of the display. Other systems may employ a raster scan display configured to produce a map-like image. Those skilled in the art will appreciate that any suitable radar output device may be employed by the present invention.

Figure 3:
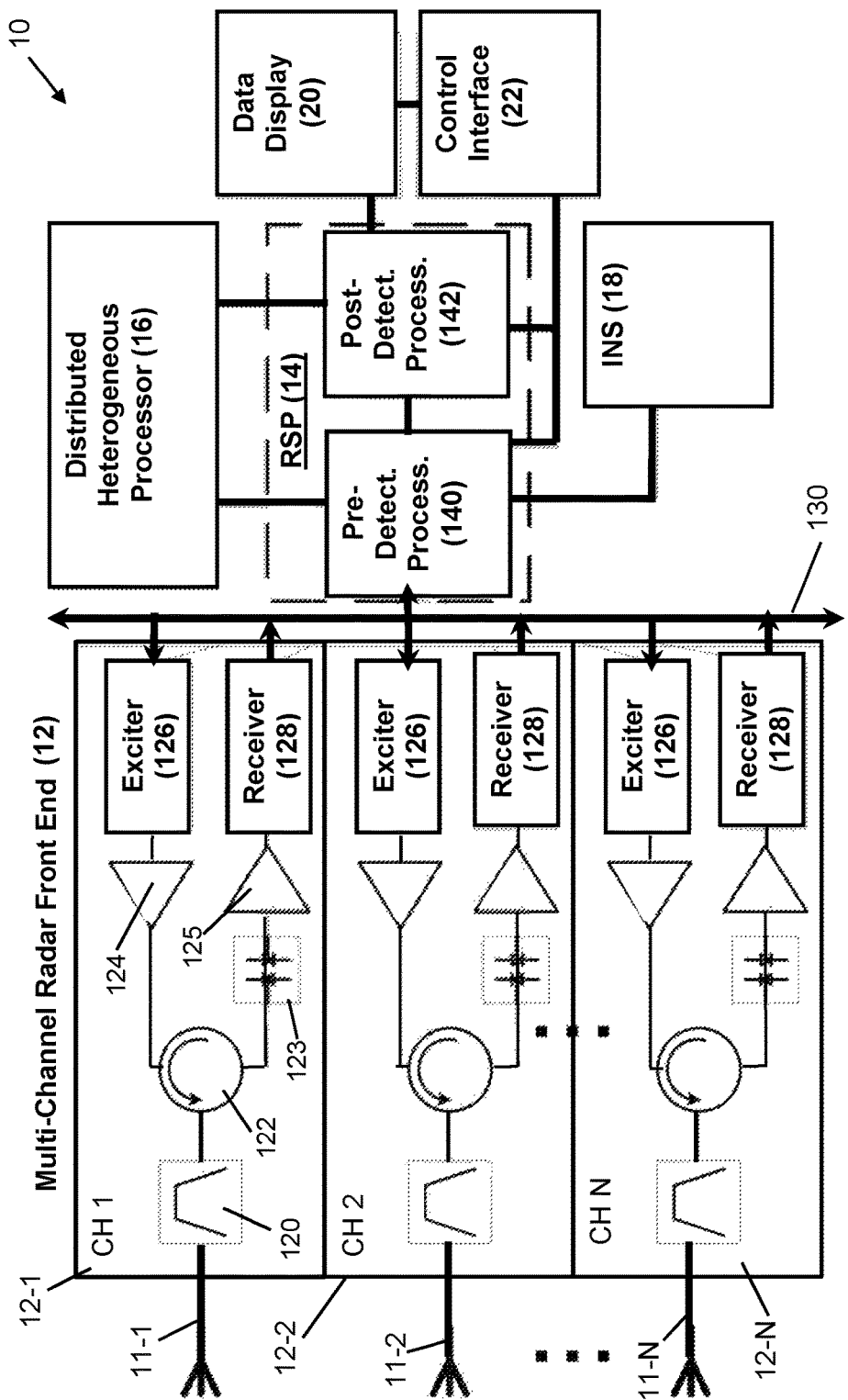
FIG. 3 is a diagrammatic depiction of the radar front-end coupled to the radar signal processing elements in accordance with an embodiment of the present invention.

Referring to FIG. 3, a diagrammatic depiction of the radar assembly 12 coupled to the radar signal processor 14 in accordance with an embodiment of the present invention is disclosed. The radar assembly 12 includes N-channels, where in general, N is an integer value greater than or equal to two (2). The antenna elements 11-1, 11-2 . . . 11-N are shown coupled to the RF assembly channels 12-1, 12-2 . . . 12-N, respectively. Each antenna element 11-i is coupled to a band pass filter (BPF) 120 in its corresponding RF Channel 12-i, where i is an integer within the range 1-N.

The BPF 120 is configured to filter incident RF signals so that only RF signals in the frequency band of the chirp signal are allowed to propagate toward RF receiver 128 (via circulator 122, isolator circuit 123 and low noise amplifier (LNA) 125). In the RF receiver 128, the filtered and amplified RF signal is applied to a mixer stage. The mixer is configured to multiply the filtered and amplified RF signal and a local oscillator signal (by a process commonly referred to as heterodyning) in order to obtain an intermediate frequency (IF) signal that is ultimately provided to the radar signal processor 14.

Each RF channel (12-1 . . . 12-N) also includes a transmit portion that includes an exciter 126 coupled to a power amplifier 124. In one embodiment, the exciter 126 includes a waveform generator that is configured to generate a waveform having a predefined and complex structure suitable for generating a modulated signal such as a chirp. The waveform is subsequently upconverted (i.e., modulated—or translated in frequency—from an IF signal to an RF signal). The power amplifier 124 is configured to amplify the RF transmit signal and may be implemented using any suitable device consistent with the overall RF design and may include a traveling wave tube (TWT) amplifier, a Klystron type amplifier, a solid state type amplifier, etc.

The multi-channel RF system 12 is coupled to the radar signal processor 14 by way of a transceiver bus 130. The bus 130 includes a transmit side bus and a receive side bus and is configured to provide each channel 12-N with its corresponding transmit/receive signals under the control of RSP 14.

The radar signal processor 14 includes a pre-detection processor 140 coupled to a post-detection processor 142; both of these processing elements are coupled to a distributed heterogeneous processor 16 that is configured to perform target detection. The pre-detection processor 140 is also coupled to an inertial navigation system (INS) 18 that is configured to provide the pre-detection processor 140 with real-time navigational and motion data that allows the pre-detection processor 140 to determine the location and orientation of the airborne platform. Obviously, this information may be employed in the process of registering the antenna platform location with the SAR image and the range-Doppler cell data.

Once the target detection data is conditioned by the post detection processor 142, it is provided to the radar display 20. The system 10 also includes a control interface that allows a user to provide control data and access the system 10 for information.

Referring to FIG. 4, a diagrammatic depiction of the pre-detection processor 140 shown in FIG. 3 is disclosed. The pre-detection processor 140 includes a pre-STAP processing portion 140-1 (for each channel) coupled to the ADS-STAP processor 140-2 (which is described in greater detail in FIG. 5).

The pre-STAP processing portion 140-1 is coupled to the receiver (Rcvr 1-N) portion of the RF assembly 12 so that analog IF radar signals are provided to the analog-to-digital converter (A/D) 142. A/D 142 is configured to convert the analog IF signals (from the receiver) into a digital signal samples. The digital samples are provided to the digital demodulator 144 which provides quadrature signals I, Q. The I, Q signals are provided to the pulse compression block 146 whereby the I/Q range samples are calibrated and are range compressed. (Calibration refers to accurately relating the receive antenna beam-port complex voltages of the radar to the corresponding angular directions of a detected target). Finally, the range compressed quadrature (I/Q) signals are provided to the motion compensation processing block 148 before being directed to the ADS-STAP processor 140-2.

As those skilled in the art will appreciate, A/D 142 may be implemented using any suitable ADC, i.e., a device configured to convert analog IF signals into a digital signal samples representative of the IF signal's amplitude at a point in time. By suitable, the A/D 142 must at least be configured to sample the IF signal at a sampling rate that is higher than twice the highest frequency of the signal (See Nyquist Theorem). A/D 142 may also be specified in terms of other parameters such as resolution, linearity, jitter, etc.

The digital demodulator block 144 multiplies (demodulates) the digital sample by a cosine reference signal and a sine reference signal to produce a baseband in-phase digital signal (I) and a baseband quadrature digital signal (Q), (the quadrature digital signal (Q) being 90° out-of-phase with respect to the in-phase digital signal). The quadrature signals I/Q allow the digital receiver to remove unknown phase dependencies from the received radar signals.

In the calibration & pulse compression block 146, the range samples are converted into the frequency domain (from the time domain) and multiplied by a range reference function that is based on the transmitted chirp signal. (Multiplication is the frequency domain is equivalent to convolution in the time domain). The pulse compression block 146 thus performs the first step in the SAR image formation process. With respect to calibration, electromagnetic (EM) fields impinging on antenna arrays excite voltages at the radar beamformer and element ports. For many antenna applications, it is important to create tables that accurately relate these voltages to the corresponding radiated EM field patterns (the patterns relate the field values to the directions of incident fields). Calibration also maximizes mainbeam gain and lowers the sidelobes.

The motion compensation block 148 is coupled to the inertial navigation circuitry 18 (FIG. 3) and is configured to compensate for errors introduced by platform 100 skew and motion. The INS 18 may include motion sensors (e.g., accelerometers) and rotation sensors (e.g., gyroscopes) and a computer to determine the platform's position, orientation and velocity, in three-dimensional space, through the process of dead reckoning. For more accurate positioning, an accompanying GPS unit may be configured to take periodic fixes to reduce the INS integration drift error.

Figure 5:
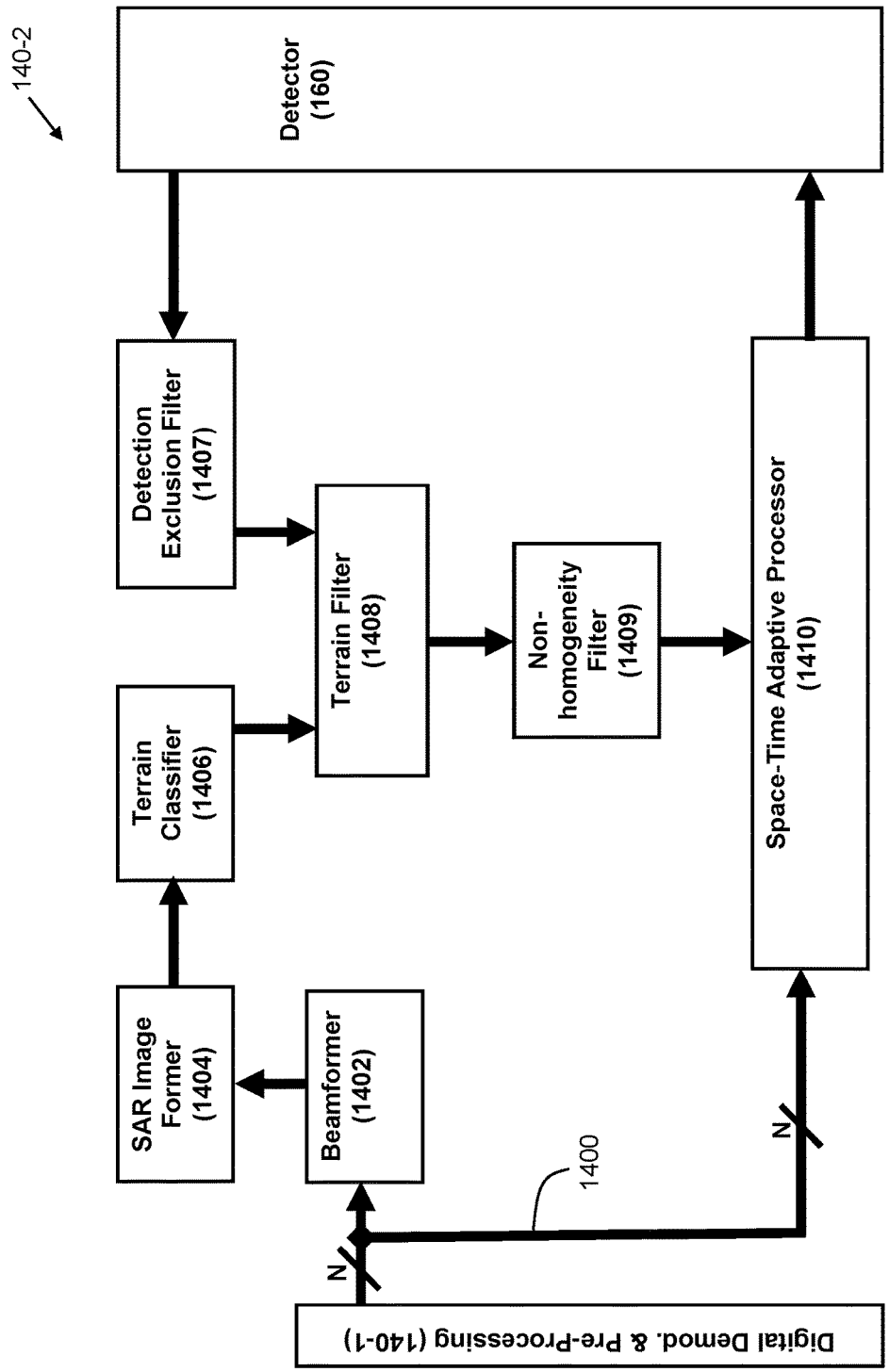
FIG. 5 is a diagrammatic depiction of the ADS-STAP processor depicted in FIG. 4.

Referring to FIG. 5, a diagrammatic depiction of the ADS-STAP processor 140-2 depicted in FIG. 4 is disclosed. As noted previously, the N-range compressed digital return signals are directed along parallel processing paths: the first path includes the SAR image former and terrain evaluation (1402-1409); and the second path includes the STAP processor 1410 and detector 160.

With respect to the SAR image forming path, the N-range compressed digital return signals are provided to the beamformer 1402 which is configured to increase the gain of the signal-of-noise ratio associated with the footprint region 100-12 (FIG. 1).

The SAR image former 1404 is configured to provide a two-dimensional image of the operating environment 1000 (FIG. 1). Similar to a conventional range-Doppler radar, SAR sensors typically use frequency modulated pulsed waveforms for transmission, the so-called chirp signal referred to above. The amplitude of the transmitted waveform may be constant during the pulse time, while the instantaneous frequency is varied over time (i.e., the chirp rate). Like STAP, SAR refers to the time in the range direction as fast time and time in the azimuth as slow time. SAR processing can be thought of as including two steps: range pulse compression and cross-range compression. (Cross-range is defined as the direction that is both perpendicular to the range direction and lies in the plane of the SAR image grid 600 (FIG. 6))

The range pulse compression step was previously performed in block 146 (FIG. 4); each range line was multiplied in the frequency domain by the complex conjugate of the spectrum of the transmitted chirp to produce a range compressed image. As noted above, pulse compression is performed as a multiplication in the frequency domain in order to lower the computational burden (since performing a convolution in the time domain is much more complicated). Signals are converted from the time domain into the frequency domain by a Fast Fourier transform (FFT) device.

The geographic locations of the pixels that comprise the SAR Image Grid 600 are an input to the second step of this process; these locations are selected to cover the image scene including the illumination footprint 100-12 (FIG. 1) of the CPI. The SAR image former 1404 performs the second step of this process by integrating the pulse-compressed returns from all of the pulses in the CPI. This step can be accomplished by back-projecting the received pulses onto the SAR Image grid 600 according to the following formula known as the Back-projection Algorithm (BPA), wherein, $\alpha_k$ is the complex value of the kth range sample as interpolated to $r_m$, the range of pixel i at the time of pulse n, and $\lambda$, is the wavelength of the transmitted wave, and $r_{ref,n}$ is the range to the image focal point at the time of pulse n. Summing over all of the pulses, the total complex value of the SAR image of channel m at pixel i is:

$$S_{i,m} = \Sigma \{\alpha_k \exp[j4\pi(r_{i,n}-r_{ref,n})/\lambda]\} \quad (1)$$

The resultant SAR image is comprised of complex values; each image pixel gives an indication of the reflectivity or "scattering" of the corresponding point on the ground. In one embodiment of the present invention, the SAR image former 1404 forms SAR images for each of multiple, calibrated polarization channels, so that the aggregated value at each image pixel is a complex scattering matrix. Subsequently, the SAR image pixel values, as well as their geographic locations, are provided to the terrain classifier 1406.

The partition function of the terrain classifier 1406 partitions the set of pixels of the SAR image into small sub-sets. In one embodiment of the present invention, the partitions can be chosen such that each pixel within one sub-set is geographically located within the same range-Doppler cell, and approximately represent that range-Doppler cell.

This embodiment of the partition function requires a mapping function that determines the index of the range-Doppler cell associated with each pixel. With regard to this mapping function, the geographic location and the range of the SAR pixels 602 has been previously calculated by the SAR Image Former 1404. The formula for the range to pixel i is simply the Euclidean distance between the points $P_i$ $(x_i,y_i,z_i)$ and $P_r(x_r,y_r, z_r)$. The functional form of the equation is given as:

$$R_i = \text{sqrt}((x_i-x_r)^2 + (y_i-y_r)^2 + (z_i-z_r)^2) \quad (2)$$

The index of the range cell associated with pixel i can then be calculated by dividing the range $R_i$ by the slant range cell resolution, and then rounding up to the nearest integer.

The Doppler frequency $f_{d,i}$ of a SAR pixel i can be calculated by the following formula:

$$f_{d,i} = 2(k_i \cdot v_r)/\lambda \quad (3)$$

where k is the unit vector pointing from the radar position $P_r$ 100 to the Earth at the geographic location $P_i$ of pixel i, $v_r$ is the radar's velocity vector, and $\lambda$ is the wavelength of the radar. The index of the Doppler cell associated with pixel i can then be calculated by dividing the Doppler frequency $f_{d,i}$ by the Doppler cell resolution, and then rounding to the nearest integer.

Figure 6:
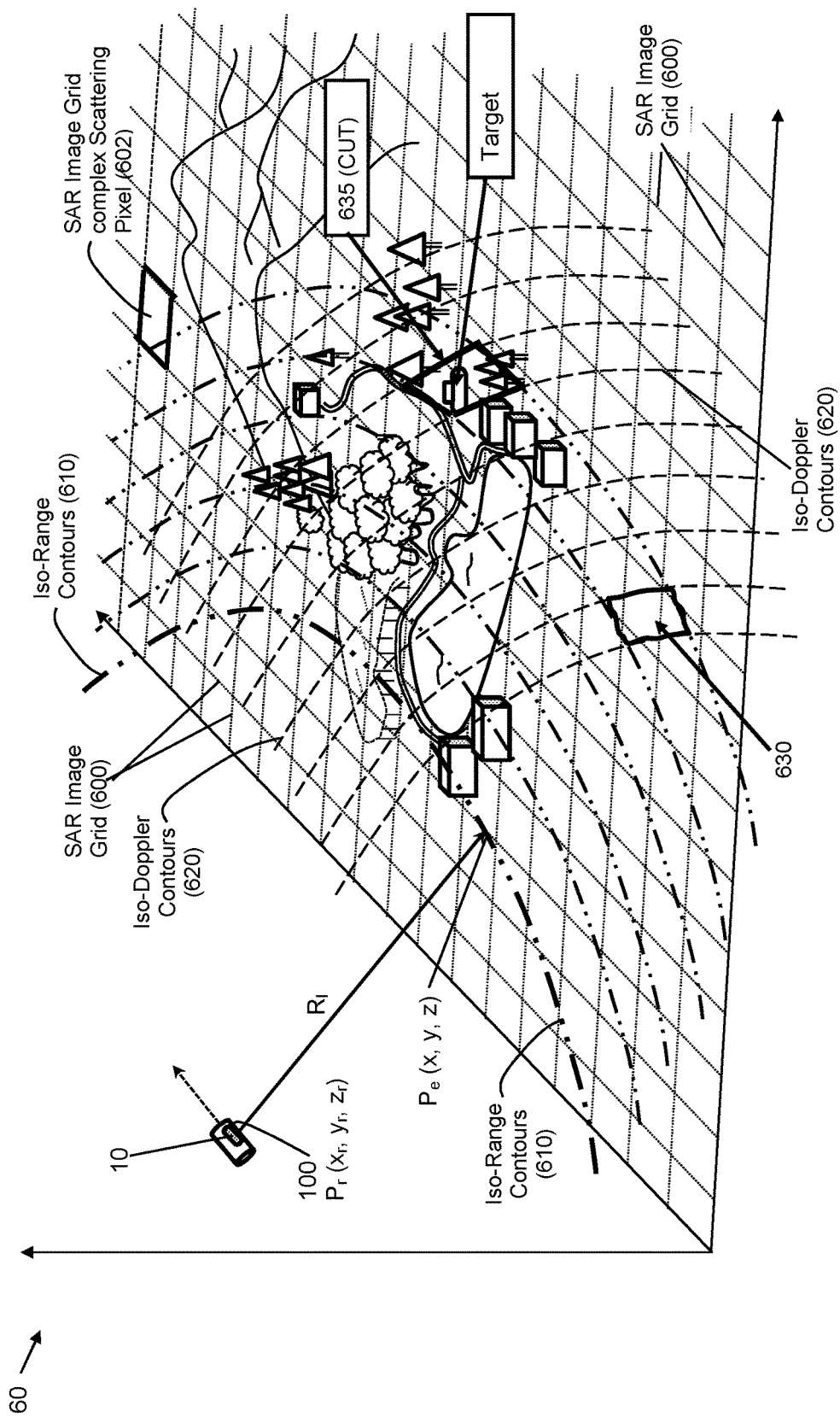
FIG. 6 is an illustration of terrain classification in accordance with an embodiment of the present invention.
Figure 7:
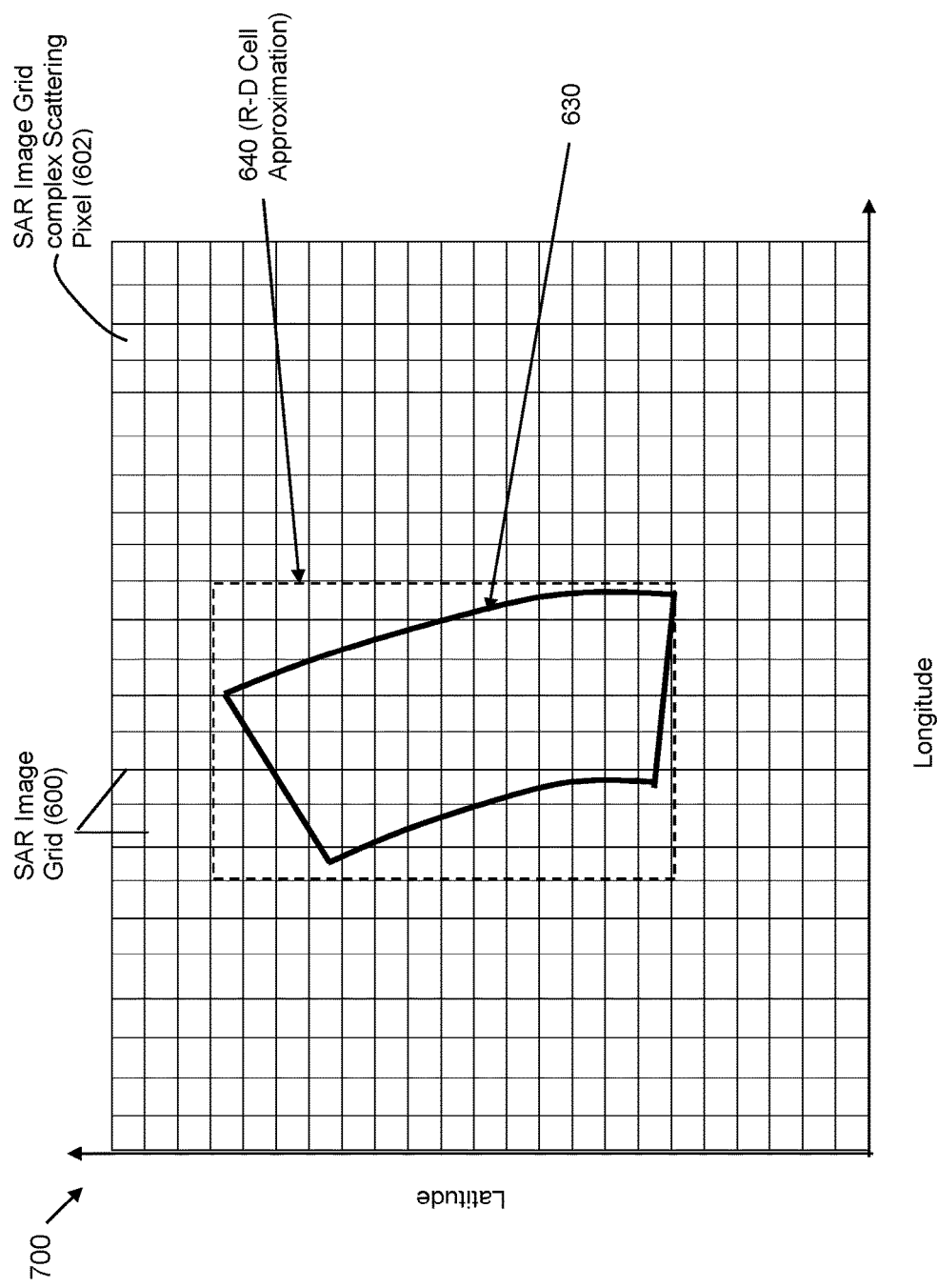
FIG. 7 is a detail view of FIG. 6 illustrating a registration technique in accordance with the present invention.

Referring to FIG. 7, a detail view of FIG. 6 illustrates this embodiment of the partition function. The SAR Image former 1404 has previously registered the SAR image grid 600 to a sector 700 on the earth that is specified by latitude and longitude. As shown in FIG. 6, the intersection of iso-range contours 610 and iso-Doppler contours 620 creates a range-Doppler cell 630 superimposed over the SAR image grid 600. The partition function of the terrain classifier 1406 is further configured to map each pixel 602 within a range-Doppler cell 630. (While the pixel size appears rather large in the illustration of FIG. 6, those skilled in the art will appreciate that each range-Doppler cell 630 may include many pixels).

Note also that the boundaries of a typical range-Doppler cell 630 will not align to the SAR image pixel grid 600. Since these boundary contours do not align with the SAR image grid 600, this embodiment of the partition function results in partitions comprised of pixelated representations of each range Doppler cell in the manner illustrated in FIG. 7.

The terrain classifier 1406 assigns a category to each sub-set of pixels 640. In one embodiment of the present invention, the pixels in the SAR image data are quantized so that each pixel is represented by an intensity value (e.g., a four bit scheme yields 16 levels, an eight bit quantization scheme has 256 intensity levels, etc.). In the 8-bit quantization scheme described above, the terrain classifier 1406 would rate a given pixel intensity as having one of 256 discrete intensity levels. The terrain classifier 1406 determines the intensity values for each pixel in the sub-set 640. In the 8-bit scheme, the results are stored in a 256-element "observation vector" $t_l$ and thus, the terrain classifier 1406 (FIG. 5) assigns each pixel in rectangle 640 to one of 256 categories (depending on its intensity). The observation vector $t_l$ is normalized by dividing it by the total number of pixels contained in the sub-set 640, resulting in $t_l$ representing the discrete probability distribution of intensities within the sub-set 640. The normalized observation vector for the lth sub-set is represented by $$t_l = [t_{l,1}, t_{l,2}, \ldots, t_{l,256}]^T \quad (4)$$

Note that as the range increases, the range-Doppler cells tend to include more pixels; thus, the range-Doppler cell intensity measure—for clustering purposes—must be normalized. Thus, dividing the vector $t_l$ by the total number of pixels contained in the cell-approximation rectangle 640 accounts for the variation in area of the different range-Doppler cells.

Another embodiment of the terrain classifier 1406 can use information in addition to image intensity within the observation vector, such as the standard deviation or higher order statistical measures of intensity values within the subset, and the variance of intensity and phase across receiver channels and polarimetric combinations.

After the observation vector $t_l$ for all of the range-Doppler cells at the Doppler of interest is determined, the vectors of potential secondary data cells are compared with the vector of the test cell by computing the squared error between their elements. This process provides a measurement, or grade, of how close the nth range-Doppler cell matches the test cell. The grade can be defined by $$\text{grade}_{l'} = \sum_{i=1}^{21} (t_{l,i} - t_{l',i})^2 \qquad (5)$$

where $t_{l,i}$ is the ith element of the test cell observation vector and $t_{l',i}$ is the ith element of the of the potential secondary data terrain vector. Cells with lower grades are assumed to better match the test cell. The grades are sorted and the top cells are chosen as secondary data. Although a squared error minimal distance estimator may be employed to perform the grading function, the present invention should not be construed as being limited to this method since other suitable methods may be used.

Another embodiment of the terrain classifier 1406 can use other methods of clustering the observation vectors (such as "k-means clustering") and assigning categories. Those skilled in the art will appreciate that any suitable classifier may be employed by the present invention.

Referring back to FIG. 5, at the end of the terrain classification process, the terrain classifier 1406 produces a clutter classification map that characterizes each range Doppler cell with a normalized intensity rating.

Once the terrain filter 1408 receives the clutter classification map from the classifier 1406, the terrain filter 1408 processes the clutter classification map, in order of range, one range-Doppler cell at a time. Specifically, filter 1408 compares the category assigned to each range-Doppler cell to the cell under test (CUT) 635 to identify M suitable training cells for a covariance matrix calculation, wherein M is an integer value (e.g., 40). Stated differently, the M-training cells are characterized by complex scattering vectors most similar to the CUT.

The M training cells are provided to the non-homogeneity filter 1409. At this point in the process, there still may be "movers", i.e., other moving objects, in one or more of the training cells. These "movers" tend to "smear" in the SAR image within an impacted training cell. The smear may be represented in the SAR image as slight change in the intensity of the impacted training cell. In order to detect such smears or other such anomalies, the non-homogeneity filter 1409 may be configured to compute a statistical average intensity of the M training cells. The normalized intensity vector of each of the M training cells is compared to this statistical average. The non-homogeneity filter 1409 selects the best M/2 (e.g., twenty (20)) training cells based on the statistical similarity of each cell to the statistical average in an effort to weed out smeared or anomalous cells.

At this point in time, the non-homogeneity filter provides the STAP processor 1410 with the M/2 (e.g., 20) best training cells for the covariance matrix calculation. Within the M/2 best clutter training cells, the location to the center of the kth clutter cell in the lth range sample is specified by a slant range $R_l$, and an azimuthal angle $\varphi_k$. The slant range is determined by the elevation angle $\varphi_l$. The airborne radar platform is assumed to be moving along the x-axis with a velocity $v_r$. If the clutter cell is treated as a point scatterer, the down-converted and matched filter response in the nth spatial channel due to the mth pulse of the CPI is given by $$X_{nmlk} = \alpha_{lk} \exp[j_2\pi(m\omega_{lk} + nv_{lk})] \qquad (6)$$

where the normalized Doppler frequency is $$\omega_{lk} = (2\eta_r/f_r\lambda)\cos\theta_l \sin\varphi_k \qquad (7)$$

the normalized spatial frequency is $$v_{lk} = d/\lambda \cos\theta_l \sin\varphi_k \qquad (8)$$

Wherein, $\alpha_{lk}$ is the complex amplitude of the lkth clutter patch, $f_r$ is the PRF, $\lambda$ is the wavelength of the transmitted wave, and d is the horizontal inter-element spacing of the radar array. Summing over all of the clutter patches in the lth range sample, the total response in the nth channel due to the mth pulse is $$X_{nml} = \Sigma\{\alpha_{lk} \exp[j2\pi(m\omega_{lk} + nv_{lk})]\} \qquad (9)$$

Note that the various clutter patches contribute to the total response separately, with different normalized Doppler and spatial frequencies and complex amplitudes determined by the scattering properties of each patch. The clutter covariance matrix for the lth range sample is expressed as $$M_l = \sum_{k=1}^{N_c} E[|\alpha_{lk}|^2] v_{lk} v_{lk}^H \qquad (10)$$

where $E[\bullet]$ denotes the expectation operator, H is the conjugate transpose, and $v_{lk}$ is the space-time steering vector expressed by $$v_{lk} = b(\omega_{lk}) \otimes a(v_{lk}) \qquad (11)$$

which is the Kronecker matrix product of the temporal steering vector, $$b(\omega_{lk}) = [1, e^{j2\pi\omega_{lk}}, \ldots, e^{j(M-1)2\pi\omega_{lk}}]^T \qquad (12)$$

and the spatial steering vector, $$a(v_{lk}) = [1, e^{j2\pi v_{lk}}, \ldots, e^{j(N-1)2\pi v_{lk}}]^T. \qquad (13)$$

Hence, estimation of the clutter covariance matrix M reduces to the estimation of $E[|\alpha_{lk}|^2]$, the mean-squared value of the complex amplitude magnitude for each clutter patch in the range sample, assuming there is no mismatch in the steering vectors.

The STAP processor 1410 uses the clutter covariance matrix M to produce the adaptive weights of the weight vector W $$W = km^{-1} v_{lk} \qquad (14)$$

where k is a scalar that does not affect the results.

The adaptive weights are provided to the detector 160 wherein the Hermitian transpose of the weight vector W is applied to the received data to obtain a statistical measure. If the statistical measure is above a predetermined threshold, detector 160 indicates that a target is present. If not, detector 160 indicates that no target is present. The resulting detections are fed into the Detection Exclusion Filter 1407 which removes them from the candidate set of training cells when STAP is re-run on the resultant data. The goal of the detection exclusion filter is to remove returns lower in magnitude than the clutter which may have been missed by the Terrain Filter 1408 and the Non-homogeneity Filter 1409. STAP 1410 is re-run on the data, the results are given to the detector 160, detected against as previously done, and detections are passed to the downstream processing.

It will be apparent to those of ordinary skill in the pertinent art that modifications and variations can be made to the methods used to calculate the covariance matrix M and the weight vector W of the present invention depending on, for example, the processing resources used to implement the ADS-STAP processor 140-2 (FIG. 5) and the ability to obtain a constant false alarm rate (CFAR). Furthermore, similar statistics, reduced rank methods, parametric methods, could also be applicable and employed.

Figure 8:
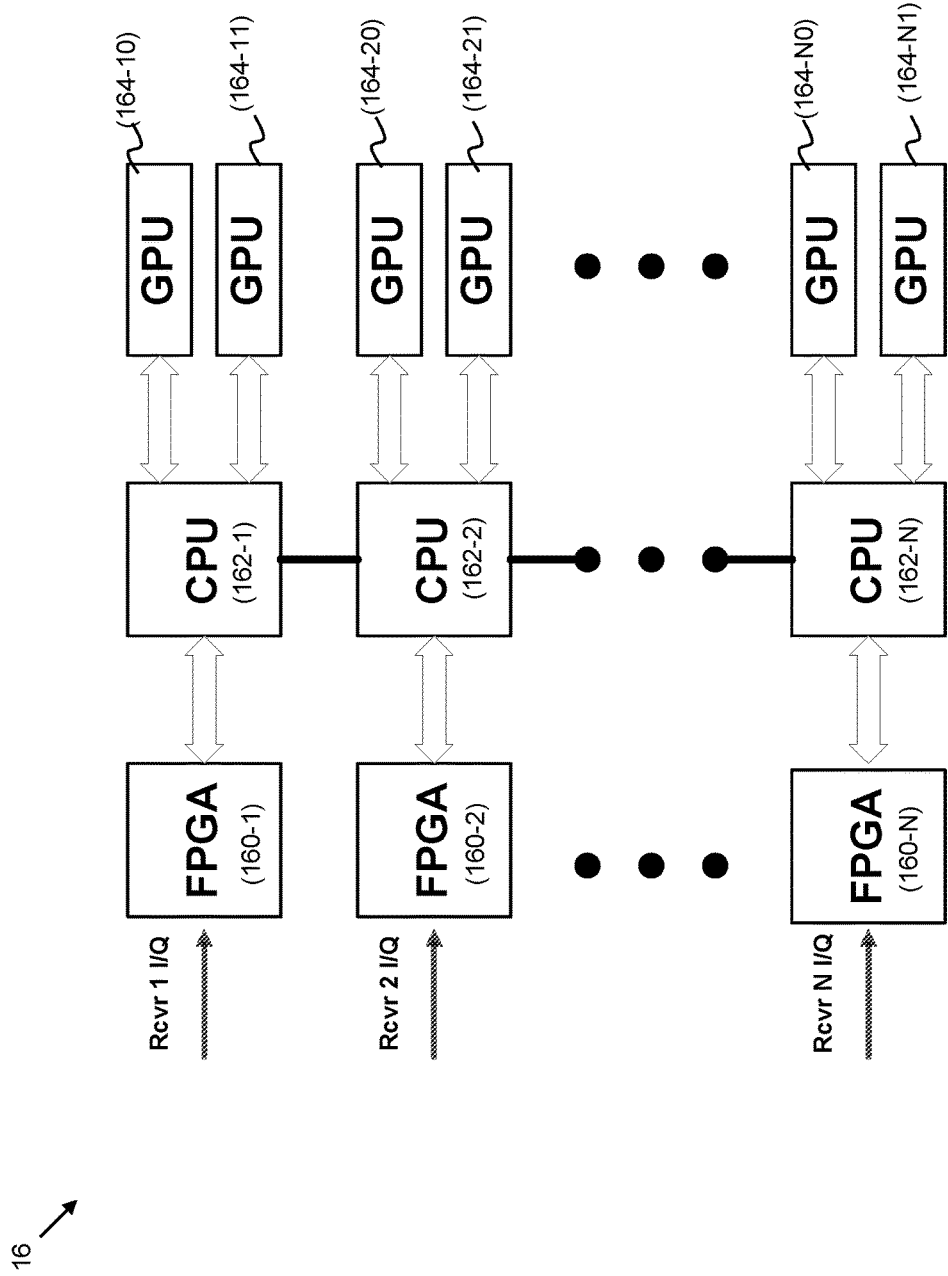
FIG. 8 is a diagrammatic depiction of the distributed heterogeneous processor in accordance with an embodiment of the present invention.

Referring to FIG. 8, a diagrammatic depiction of the distributed heterogeneous processor 80 in accordance with an embodiment of the present invention is disclosed. Since different portions of the signal processing chain described herein may be processed more efficiently utilizing different processor types (e.g., central processing units [CPU], graphics processing units [GPU], field-programmable gate array [FPGA], etc.), a distributed heterogeneous processing system allows the most flexibility in maximizing overall system processing performance.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A radar system comprising:
   an RF assembly configured to convert incident RF signals reflected from an operating environment into a plurality of digital signals, the plurality of digital signals including at least clutter signal components;
   an image forming circuit coupled to the RF assembly, the image forming circuit being configured to provide a two-dimensional image of the operating environment based on the plurality of digital signals, the two-dimensional image including a plurality of pixel elements representative of the operating environment;
   at least one filter coupled to the image forming circuit, at least one filter being configured to convert the two-dimensional image into a clutter classification map comprising a plurality of clutter regions, the at least one filter being further configured to select a predetermined number of clutter regions from the plurality of clutter regions for use as training cells for a predetermined cell-under-test (CUT), wherein at least one filter includes a non-homogeneity filter that compares candidate training data statistics to identify outlier training cells within candidate training cells, the outlier training cells being excluded from the training cells; and
   a space-time adaptive processor (STAP) coupled to the at least one filter, the STAP being configured to derive a weighted filter from the digital signals corresponding to the training cells, the STAP being further configured to apply the weighted filter to a digital return signal associated with the predetermined CUT to provide a STAP filtered digital return signal having the clutter signal components substantially eliminated therefrom
   wherein the candidate training data statistics are based on higher-order phase information obtained from channels, pulses, or Doppler, the non-homogeneity filter being configured to use the higher-order phase information to identify statistically similar training data and statistically dissimilar training data, the candidate training cells being characterized by statistically dissimilar training data are identified as outlier training cells and are excluded from the training cells.

2. The system of claim 1, wherein the plurality of clutter regions are range-Doppler cells.

3. The system of claim 1, wherein the image forming circuit includes a synthetic aperture radar (SAR) processing circuit, the two-dimensional image being a SAR image based on the plurality of digital signals, the SAR image including a plurality of pixel elements representative of the operating environment, each pixel element being characterized as an complex scattering value.

4. The system of claim 3, wherein each clutter region is characterized by a composite scattering value based on the complex scattering values of the pixel elements within the clutter region.

5. The system of claim 3, wherein each complex scattering value is based on a complex scattering matrix.

6. The system of claim 1, wherein at least one filter includes a terrain classifier circuit coupled to the image forming circuit, the terrain classifier being configured to register the plurality of clutter regions to geographical coordinates on the Earth and determine a range associated with each pixel of the plurality of pixels relative to the radar system.

7. The system of claim 6, wherein the terrain classifier circuit is further configured to partition the plurality of pixels into a plurality of pixel sets, each pixel set substantially corresponding to one of the plurality of clutter regions.

8. The system of claim 7, wherein the terrain classifier circuit is further configured to derive an classification vector for each pixel set, the training cells being selected based on comparing the classification vector of each clutter region to the classification vector of the predetermined CUT.

9. The system of claim 1, wherein the at least one filter comprises:
   a terrain classifier circuit configured to subdivide the two-dimensional image into a plurality of classification regions substantially corresponding to the plurality of clutter regions, the terrain classifier circuit being further configured to derive a classification vector for each classification region; and
   a terrain filter configured to select a set of similar clutter regions from the plurality of classification regions on the basis of their respective classification vectors.

10. The system of claim 9, wherein each pixel of the plurality of pixels disposed in a classification region is characterized by a value, the classification vector for each classification region being based on the values of the plurality of pixels disposed in a classification region.

11. The system of claim 9, wherein the at least one filter further comprises a non-homogeneity filter, the non-homogeneity filter being configured to select the training cells from the set of similar clutter regions based on comparing the classification vector for each clutter region to a predetermined similarity value.

12. The system of claim 11, wherein the predetermined similarity value is related to a statistical average of the classification vectors associated with the set of similar clutter regions.

13. The system of claim 9, further comprising a detector circuit coupled to the STAP, the detector being configured to designate the STAP filtered digital return signal as a detection if the STAP filtered digital return signal is greater than a predetermined threshold.

14. The system of claim 13, wherein the terrain filter is configured to remove a CUT from a subsequent set of similar clutter regions when the detector determines that the STAP filtered digital return signal in the CUT is a detection.

15. The system of claim 1, wherein the weighted filter is based on an interference covariance matrix.

16. The system of claim 1, wherein the candidate training data statistics are based on statistics obtained from a magnitude median filter.

17. The system of claim 1, further comprising:
   a detector circuit coupled to the STAP, the detector being configured to designate the STAP filtered digital return signal as a detection if the STAP filtered digital return signal is greater than a predetermined threshold; and
   a detection exclusion filter configured to exclude a former CUT clutter region from a subsequent set of similar clutter regions when the detector determines that the STAP filtered digital return signal from the former CUT clutter region yielded a target detection.

18. The system of claim 1, further comprising a detection exclusion filter that uses a relatively low predetermined threshold to detect relatively weak target return signals in the CUT, the relatively weak target return signals having signal characteristics comparable to the clutter signal components, and wherein the STAP excludes each CUT that yields a target detection from a subsequent weighted filter derivation.

19. A method for use in a radar system, the method comprising:
  providing a plurality of digital signals corresponding to incident RF signals reflected from an operating environment, the plurality of digital signals including clutter signal components;
  providing a two-dimensional image of the operating environment based on the plurality of digital signals, the two-dimensional image including a plurality of pixel elements representative of the operating environment;
  converting the two-dimensional image into a clutter classification map comprising a plurality of clutter regions;
  selecting a predetermined number of clutter regions from the plurality of clutter regions for use as training cells for a predetermined cell-under-test (CUT), the predetermined CUT having a digital return signal associated therewith;
  deriving a weighted space-time adaptive (STAP) filter from the digital signals corresponding to the training cells; and
  applying the weighted STAP filter to the digital return signal to substantially eliminate the clutter signal components from the digital return signal to provide a STAP filtered digital return signal;
  comparing candidate training data statistics to identify outlier training cells within candidate training cells, the outlier training cells being excluded from the training cells, wherein the candidate training data statistics are based on higher-order phase information obtained from channels, pulses, or Doppler, the higher-order phase information being employed to identify statistically similar training data and statistically dissimilar training data, the candidate training cells being characterized by statistically dissimilar training data are identified as outlier training cells and are excluded from the training cells.

20. The method of claim 19, wherein the plurality of clutter regions are range-Doppler cells.

21. The method of claim 19, wherein the two-dimensional image is SAR image having a plurality of pixel elements representative of the operating environment, each pixel element being characterized by a value.

22. The method of claim 21, wherein each clutter region is characterized by a composite scattering value based on the values of the pixel elements within the clutter region.

23. The method of claim 21, wherein each value is based on a complex scattering matrix.

24. The method of claim 21, wherein the training cells are selected in accordance with their respective composite scattering values.

25. The method of claim 19, further comprising the steps of:
  registering the plurality of clutter regions to geographical coordinates on the Earth; and
  determining a range associated with each pixel of the plurality of pixels relative to the radar system.

26. The method of claim 25, further comprising the step of partitioning the plurality of pixels into a plurality of pixel sets, each pixel set substantially corresponding to one of the plurality of clutter regions.

27. The method of claim 26, wherein the step of selecting the training cells includes:
  deriving a classification vector for each pixel set; and
  comparing the classification vector for each pixel set to the classification vector of the predetermined CUT.

28. The method of claim 19, further comprising the steps of:
  subdividing the two-dimensional image into a plurality of classification regions substantially corresponding to the plurality of clutter regions;
  deriving a classification vector for each classification region; and
  selecting a set of similar clutter regions based on their respective classification vectors.

29. The method of claim 28, wherein each pixel of the plurality of pixels disposed in a classification region is characterized by a complex scattering value, the classification vector for each classification region being based on the complex scattering values of the plurality of pixels disposed in a classification region.

30. The method of claim 28, further comprising the step of selecting the training cells from the set of similar clutter regions based on comparing the classification vector of each clutter region in the set of similar clutter regions to a predetermined similarity value.

31. The method of claim 30, wherein the predetermined similarity value is related to a statistical average of the classification vectors associated with the set of similar clutter regions.

32. The method of claim 31, further comprising the step of designating the STAP filtered digital return signal as a detection if the STAP filtered digital return signal is greater than a predetermined threshold.

33. The method of claim 19, wherein the candidate training data statistics are based on statistics obtained from a magnitude median filter.

34. The method of claim 19, wherein the weighted filter is based on an interference covariance matrix.

35. The method of claim 19, further comprising the steps of: designating the STAP filtered digital return signal as a detection if the STAP filtered digital return signal is greater than a predetermined threshold; and excluding a former CUT clutter region from a subsequent set of similar clutter regions when determining that the STAP filtered digital return signal from the former CUT clutter region yielded a target detection.

36. The method of claim 19, further comprising the steps of: using a relatively low predetermined threshold to detect relatively weak target return signals in the CUT, the relatively weak target return signals having signal characteristics comparable to the clutter signal components; and excluding each CUT that yields a target detection from a subsequent weighted filter derivation.

37. A radar system comprising:
  an RF assembly configured to convert incident RF signals reflected from an operating environment into a plurality of digital signals, the plurality of digital signals including at least clutter signal components;
  an image forming circuit coupled to the RF assembly, the image forming circuit being configured to provide a two-dimensional image of the operating environment based on the plurality of digital signals, the two-dimensional image including a plurality of pixel elements representative of the operating environment;
  at least one filter coupled to the image forming circuit, at least one filter being configured to convert the two-dimensional image into a clutter classification map comprising a plurality of clutter regions, the at least one filter being further configured to select a predetermined number of clutter regions from the plurality of clutter regions for use as training cells for a predetermined cell-under-test (CUT);
  a space-time adaptive processor (STAP) coupled to the at least one filter, the STAP being configured to derive a weighted filter from the digital signals corresponding to the training cells, the STAP being further configured to apply the weighted filter to a digital return signal associated with the predetermined CUT to provide a STAP filtered digital return signal having the clutter signal components substantially eliminated therefrom;

a detector circuit coupled to the STAP, the detector being configured to designate the STAP filtered digital return signal as a detection if the STAP filtered digital return signal is greater than a predetermined threshold; and a detection exclusion filter configured to exclude a former CUT clutter region from a subsequent set of similar clutter regions when the detector determines that the STAP filtered digital return signal from the former CUT clutter region yielded a target detection.

38. A method for use in a radar system, the method comprising:

providing a plurality of digital signals corresponding to incident RF signals reflected from an operating environment, the plurality of digital signals including clutter signal components;

providing a two-dimensional image of the operating environment based on the plurality of digital signals, the two-dimensional image including a plurality of pixel elements representative of the operating environment;

converting the two-dimensional image into a clutter classification map comprising a plurality of clutter regions;

selecting a predetermined number of clutter regions from the plurality of clutter regions for use as training cells for a predetermined cell-under-test (CUT), the predetermined CUT having a digital return signal associated therewith;

deriving a weighted space-time adaptive (STAP) filter from the digital signals corresponding to the training cells;

applying the weighted STAP filter to the digital return signal to substantially eliminate the clutter signal components from the digital return signal to provide a STAP filtered digital return signal;

designating the STAP filtered digital return signal as a detection if the STAP filtered digital return signal is greater than a predetermined threshold; and excluding a former CUT clutter region from a subsequent set of similar clutter regions when determining that the STAP filtered digital return signal from the former CUT clutter region yielded a target detection.

* * * * *